United States Patent [19]

Eckardt et al.

[11] Patent Number: 4,726,233
[45] Date of Patent: Feb. 23, 1988

[54] ELECTRIC PRESSURE PICK-OFF

[75] Inventors: Dieter Eckardt, Nuremberg; Hettich Gerhard, Rosstal, both of Fed. Rep. of Germany

[73] Assignee: Robert Bosch GmbH, Stuttgart, Fed. Rep. of Germany

[21] Appl. No.: 921,049
[22] PCT Filed: Aug. 13, 1985
[86] PCT No.: PCT/DE85/00272
  § 371 Date: Aug. 18, 1986
  § 102(e) Date: Aug. 18, 1986
[87] PCT Pub. No.: WO86/03835
  PCT Pub. Date: Jul. 3, 1986

[30] Foreign Application Priority Data

Dec. 24, 1984 [DE] Fed. Rep. of Germany ....... 3447396

[51] Int. Cl.$^4$ .......................... G01L 7/08; G01L 9/06
[52] U.S. Cl. ........................................ 73/727; 73/49.3; 338/4; 338/42
[58] Field of Search ................. 73/706, 723, 724, 725, 73/726, 727, 728, 753, 754, 49.3; 338/4, 42

[56] References Cited

U.S. PATENT DOCUMENTS

| 4,023,562 | 5/1977 | Hynecek et al. | 73/727 |
| 4,276,533 | 6/1981 | Tominaga et al. | 73/727 |
| 4,314,225 | 2/1982 | Tomiaaga et al. | 73/721 |
| 4,661,759 | 4/1987 | Klein | 320/45 |

Primary Examiner—Donald O. Woodiel
Attorney, Agent, or Firm—Michael J. Striker

[57] ABSTRACT

A pressure pick-off for generating electrical signals comprises a reference pressure chamber which is oxygen-free, at least one pressure dependent deformable membrane closing the reference pressure chamber from a medium under pressure and supporting at least one electric sensor element, and a conductor located in the reference pressure chamber and connectable with a measuring current circuit, the conductor being formed so that during a leakage in the reference pressure chamber it is oxidized by penetrated oxygen so that it is electrically interrupted.

8 Claims, 2 Drawing Figures

ELECTRIC PRESSURE PICK-OFF

BACKGROUND OF THE INVENTION

The invention relates to a pressure pick-off for generating electrical signals of the type of the main claim. Semiconductor pressure pick-off device with integrated piezoresistive resistor bridge are known in which the sensor elements are mounted in the edge area of a membrane made from a silicon semiconductor by means of spark erosion, etching or other method and which closes a reference pressure chamber against the medium being under pressure (U.S. Pat. No. 4,079,508). The reference pressure chamber is closed under a vacuum for measuring of absolute pressures. In such and similar pressure pick-off devices which have a reference pressure chamber being filled with precious gas or being under a vacuum for pressure measuring the signals which are transmitted from the sensor elements or from a pressure switch are falsified as soon as the reference pressure chamber becomes leaky. A leakage in the reference pressure chamber in such pressure pick-off devices can only be recognized by an aftermeasuring during the maintenance of the sensors. The subject solution tries to monitor the tightness of the reference pressure chamber during the use of the pressure pick-off with connected evaluation circuit.

SUMMARY OF THE INVENTION

It is therefore an object of the present invention to provide an electric pressure pick-off which avoids the disadvantages of the prior art.

In keeping with this object, one feature of the invention resides in a pressure pick-off which comprises means forming a reference pressure chamber which is oxygen-free, at least one pressure dependent deformable membrane closing the reference pressure chamber from a medium under pressure and supporting at least one electric sensor element, and a conductor located in the reference pressure chamber and connectable with a measuring current circuit, the conductor being formed so that during a leakage in the reference pressure chamber it is oxidixed by penetrated oxygen so that it is electrically interrupted.

The inventive pressure pick-off is advantageous in that with the connected evaluation circuit the reference pressure chamber can be tested any time for an air collapse. The conductor which oxidizes during penetration of oxygen into the reference pressure chamber represents a type of a safety element which interrupts the measuring current of the sensor elements or a particular monitoring circuit. It is considered to be a further advantage that with such a monitoring of the reference pressure chamber one can use pressure pick-off devices in safety relevant parts, for example, for a tire pressure monitoring of motor vehicles. Moreover, the suggested solution is not only usable for semiconductor sensors but also for all pressure pick-off systems which operate with a reference pressure chamber.

It is particularly advantageous if the conductor, which is interrupted by oxidation, is mounted on a substrate which also supports the sensor elements. Thereby, the substrate is shaped in known manner as a pressure dependent deformable membrane in the area of the sensor elements. It is particularly advantageous for the electrical connection of the conductors if the same are connected with an electrically conducting area of the reference pressure chamber which is applied to a reference potential, on the one hand, and with an electrically insulated throughput through the reference pressure chamber, on the other hand. In the simplest manner the reference potential is applied to an annular conductor of a printed circuit board which is soldered with the edge of a capsule which closes the reference =- pressure chamber toward the outside.

BRIEF DESCRIPTION OF THE DRAWING

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawing.

DESCRIPTION OF A PREFERRED EXEMPLIFIED EMBODIMENT

Figure 1:
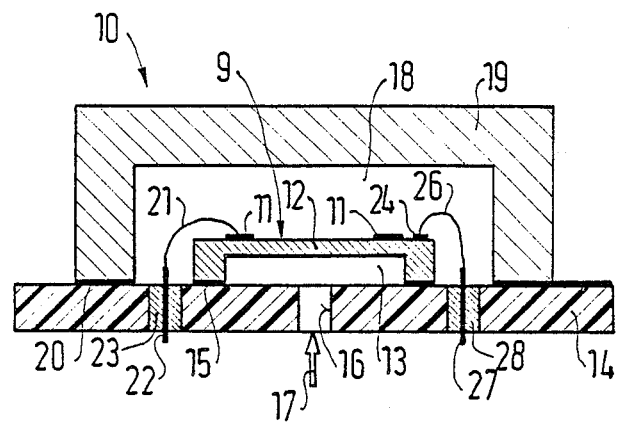
FIG. 1 is a view showing a cross section of an inventive pressure pick-off with a capsule for a reference pressure chamber on an enlarged scale.
Figure 2:
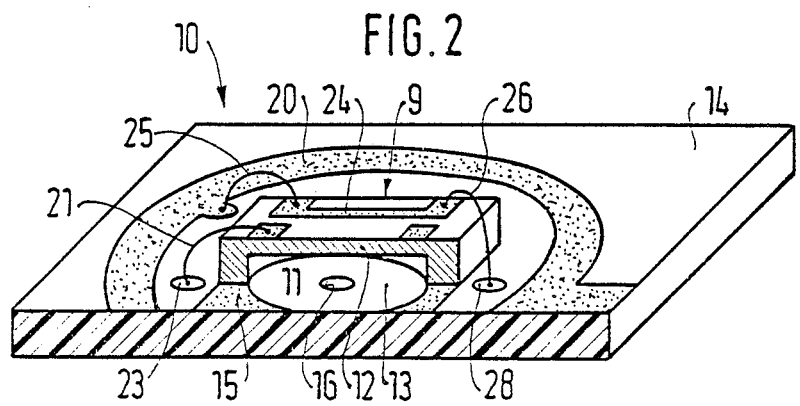
FIG. 2 is a view showing the pressure pick-off of FIG. 1 without the capsule in a plan view.

A pressure pick-off 10 illustrated in FIGS. 1 and 2 essentially consists of a semiconductor chip 9, for example. of a silicon monocrystal on the surface of which four piezo-resistive sensor elements 11 are disposed in form of a resistor bridge circuit. The sensor elements, only two of them are visible, are disposed at the edge of a membrane 12 which is deformable by outer forces and which is made by sputtering the semiconductor material in a round or elliptical area 13 on the rear side of the pressure pick-off 10. The semiconductor chip 9 is rigidly mounted on a printed circuit board 14 in that it is soldered thereto in a pressure tight manner by means of an annular conductor 15, or is adhered thereto or bonded. Thereby, the elliptical area 13 of the semiconductor chip 9 is disposed above a bore 16 in printed circuit board 14 through which a medium, for example air, gas or a liquid is fed under pressure in the direction of arrow 17 to membrane 12. In accordance with FIG. 1 a reference chamber 18 above the semiconductor chip 9 is closed toward the outside by a metal capsule 19. The reference pressure chamber 18 is closed with respect to the pressurized medium by membrane 12 and the printed circuit board 14.

In order to measure the absolute pressure of the medium with the pressure sensor 10, the reference pressure 18 is under a vacuum. For generating the vacuum the capsule 19 is pressure tight soldered or welded in a vacuum with a further annular like conductor 20 on printed circuit board 14, for example. This conductor 20 is applied to a reference potential during the use of the pressure pick-off 10, whereby preferably also the bridge circuit of the sensor elements is connected with this conductor 20. The sensor elements 11 is also connected through a connecting wire 21 with a contact pin 22 which is pressure tight disposed in a glass throughput 23 in printed circuit board 14.

A conductor 24 is mounted on the semiconductor chip 9 of the pressure pick-off 10 adjacent to the sensor elements 11 for monitoring the vacuum in the reference pressure chamber 18. Its material severely oxidizes during the penetration of oxygen into the reference pressure chamber 18, so that the conductor 24 is electrically interrupted or is severely changed in its resistance value. Conductor 24 is connected with one end through a connecting wire 25 with the annular conductor 20 of printed circuit board 14 being applied to a reference potential and with its other end by means of a further connecting wire 26 with a further contact pin 27 which is also dispsoed pressure tight in a glass throughput 28 in printed circuit board 14. When using the pressure sensor 10 the sensor elements 11 as well as the conductor 24 for monitoring the reference pressure chamber 18 are connected with an evaluation circuit, not shown. Thereby, the conductor 24 is connected to a measuring current circuit through which it can be initially determined whether the conductor 24 is still operable or not during each use of the pressure pick-off 10. Thereby, it is particularly advantageous to make the conductor 24 for monitoring the reference pressure chamber 18 from a material which in the heated condition oxidizes severely in a short time when oxygen penetrates, so that the measuring current circuit is interrupted. In the exemplified embodiment the conductor 24 is therefore made from nickel which initially is heated by a measuring current to about 500° C. during each use of the pressure pick-off 10. Subsequently the conductor 24 is tested for throughput. If a leakage occurs in the reference pressure chamber 18 oxygen flows in and the measuring current circuit with the conductor 24 is interrupted when heated. Thus, the failure of the pressure pick-off 10 is determined by the evaluation circuit and reported in this manner.

The invention is not limited to the illustrated exemplified embodiment, since the same solution principle is applicable to other pressure pick-off devices having a reference pressure chamber. In modification of the exemplified embodiment the conductor which is used for monitoring leakage may also be disposed on the printed circuit board 14, for example. It is connected with the annular conductor 20 which feeds the reference potential, on the one hand, and may be connected by means of a connecting wire with the contact pin 27 of the throughput 28, on the other hand. Furthermore, it is also possible to insert the conductor for leakage monitoring immediately into the current feeding of the sensor elements 11, whereby one of the two throughputs 22 and 28 in the printed circuit board 14 may be eliminated. In this case a continuous monitoring of the vacuum chamber during the operation is made possible by the evaluation circuit. Instead of nickel other easy oxidizing metals may be used, for example, calcium, sodium or titan. Moreover, it is also possible with the assistance of a constantly heated conductor for the leakage monitoring also to maintain the pressure pick-off 10 on a constant temperature, so as to eliminate temperature dependent fluctuations of the measuring signals transmitted from the pressure pick-off 10. The use of a material which oxidizes only at a heated condition has the further advantage that the pressure pick-off during the manufacturing under room temperature may also be finished or transported in open air. Finally, it is also possible to fill the reference chamber with a gas which is under pressure, for example, a precious gas which does not cause an oxidation of the conductor, instead of a vacuum. If a leakage would occur in the reference pressure chamber this gas would flow out and subsequently the oxygen of the air which would penetrate through the leakage would interrupt the conductor due to oxidation.

The solution principle may be used in semiconductor sensors, wire strain gauges, capacitive pressure sensors, inductive pressure pick-off devices, Hall-transmitters and other pressure absorbers, as far as they are provided with reference pressure chambers.

We claim:

1. A pressure pick-off for generating electrical signals, comprising means forming a reference pressure chamber which is oxygen-free; at least one pressure dependent deformable membrane closing said reference pressure chamber from a medium under pressure and supporting at least one electric sensor element; and a conductor located in said reference pressure chamber and connectable with a measuring current circuit, said conductor being formed so that during a leakage in said reference pressure chamber it is oxidized by penetrated oxygen so that it is electrically interrupted.

2. A pressure pick-of as defined in claim 1, wherein said reference pressure chamber forming means is formed so that said reference pressure chamber is under vacuum.

3. A pressure pick-off as defined in claim 1; and further comprising a substrate arranged in said pressure reference chamber, said conductor being supported on said substrate.

4. A pressure pick-off as defined in claim 3; and further comprising a plurality of such electric sensor elements mounted on said substrate in a predetermined area so as to form in said area said pressure dependent deformable membrane.

5. A pressure pick-off as defined in claim 1, wherein said reference pressure chamber has an electrically conductive area; and further comprising means forming an electrically insulated throughput, said conductor being connected with said electrically conductive area of said reference pressure chamber and with said electrically insulated throughput.

6. A pressure pick-off as defined in claim 5, wherein said electrically conductive area of said reference pressure chamber is formed as an annular conductor of a printed circuit board; and further comprising a capsule which is pressure-tight mounted on said printed circuit board so as to close said reference pressure chamber, so that said capsule and said deformable membrane together form said reference pressure chamber forming means.

7. A pressure pick-off as defined in claim 1, wherein said conductor is heatable by an electric current and oxidizable when heated by the penetrated oxygen.

8. A pressure pick-off as defined in claim 1, wherein said conductor is composed of nickel.

* * * * *